United States Patent
Garralda et al.

(10) Patent No.: US 9,156,950 B2
(45) Date of Patent: *Oct. 13, 2015

(54) COLLAGEN POWDER AND COLLAGEN-BASED THERMOPLASTIC COMPOSITION FOR PREPARING CONFORMED ARTICLES

(75) Inventors: Vicente Etayo Garralda, Tajonar (ES); Oliver Kotlarski, Munich (DE); Franz Maser, Mannheim (DE); Michael Meyer, Dresden (DE)

(73) Assignee: NATURIN GMBH & CO., Wienheim (DE)

( * ) Notice: Subject to any disclaimer, the term of this patent is extended or adjusted under 35 U.S.C. 154(b) by 814 days.

This patent is subject to a terminal disclaimer.

(21) Appl. No.: 12/282,674

(22) PCT Filed: Mar. 13, 2006

(86) PCT No.: PCT/EP2006/002266
§ 371 (c)(1),
(2), (4) Date: Oct. 13, 2008

(87) PCT Pub. No.: WO2007/104322
PCT Pub. Date: Sep. 20, 2007

(65) Prior Publication Data
US 2009/0226557 A1    Sep. 10, 2009

(51) Int. Cl.
| | |
|---|---|
| *C07K 14/78* | (2006.01) |
| *C08L 89/00* | (2006.01) |
| *C08H 1/06* | (2006.01) |
| *C08J 5/18* | (2006.01) |
| *C08J 9/14* | (2006.01) |
| *C08L 89/06* | (2006.01) |
| *A61K 38/00* | (2006.01) |
| *C08K 5/00* | (2006.01) |
| *C08K 5/17* | (2006.01) |
| *C08L 29/04* | (2006.01) |
| *C08L 67/02* | (2006.01) |
| *C08L 67/04* | (2006.01) |
| *C08L 67/06* | (2006.01) |

(52) U.S. Cl.
CPC ... *C08H 1/06* (2013.01); *C08J 5/18* (2013.01); *C08J 9/142* (2013.01); *C08L 89/06* (2013.01); *C08J 2389/06* (2013.01); *C08K 5/0008* (2013.01); *C08K 5/175* (2013.01); *C08L 29/04* (2013.01); *C08L 67/02* (2013.01); *C08L 67/04* (2013.01); *C08L 67/06* (2013.01); *C08L 89/00* (2013.01); *Y10T 428/139* (2015.01); *Y10T 428/1352* (2015.01)

(58) Field of Classification Search
CPC .......................................................... A61L 27/24
See application file for complete search history.

(56) References Cited

U.S. PATENT DOCUMENTS

| | | | | |
|---|---|---|---|---|
| 4,734,287 | A * | 3/1988 | Singer et al. | 426/41 |
| 4,837,285 | A * | 6/1989 | Berg et al. | 530/356 |
| 4,992,100 | A | 2/1991 | Koepff et al. | |
| 5,153,067 | A * | 10/1992 | Yoshida et al. | 428/402 |
| 5,229,497 | A | 7/1993 | Boni | |
| 5,350,590 | A * | 9/1994 | McCarthy et al. | 426/549 |
| 5,672,575 | A * | 9/1997 | Schafer | 510/114 |
| 5,753,219 | A * | 5/1998 | Cleland et al. | 424/85.7 |
| 5,910,518 | A * | 6/1999 | Nakada et al. | 523/106 |
| 6,379,725 | B1 * | 4/2002 | Wang et al. | 426/72 |
| 6,461,644 | B1 * | 10/2002 | Jackson et al. | 424/499 |
| 7,803,437 | B2 * | 9/2010 | Delius et al. | 428/34.8 |
| 2005/0175703 | A1* | 8/2005 | Hunter et al. | 424/486 |
| 2005/0208095 | A1* | 9/2005 | Hunter et al. | 424/423 |
| 2008/0187591 | A1* | 8/2008 | Rhee et al. | 424/484 |
| 2012/0021063 | A1* | 1/2012 | Matsumoto et al. | 424/602 |

FOREIGN PATENT DOCUMENTS

| | | |
|---|---|---|
| EP | 0256663 A2 | 2/1988 |
| EP | 0421450 A2 | 4/1991 |
| WO | WO 03/017770 | 3/2006 |

OTHER PUBLICATIONS

Usha et al. (2004) The effects of urea and n-propanol on collagen denaturation: using DSC, circular dicroism and viscosity, Thermoch. Acta, vol. 409, pp. 201-206.*
Ueda et al. (2003) epairing of rabbit skull defect by dehydrothermally crosslinked collagen sponges incorporating transforming growth factor b1, J. Control. Release, vol. 88, pp. 55-64.*
Tristram et al. (1965) Thermal Denaturation of Soluble Calf-Skin Collagen, Biochem J., vol. 95, pp. 350-353.*
Yannas, V., Cross-Linking of Gelatine by Dehydration, Nature, Jul. 29, 1967, vol. 215.
Yannas, V., Collagen and Gelatin in the Solid State, J. Macromol. Sci.-Revs. Macromol. Chem., C7(1), 49-104, 1972, Marcel Dekker, Inc., Massachusetts.

* cited by examiner

*Primary Examiner* — Anand U Desai
*Assistant Examiner* — Samuel Liu
(74) *Attorney, Agent, or Firm* — Notaro, Michalos & Zaccaria P.C.

(57) ABSTRACT

The invention provides a new collagen based technology. The invention provides a dry collagen powder as a precursor for the preparation of an homogeneous thermoplastic collagen-based composition, which may further comprise additives. The present invention relates also the use of said composition in the manufacturing of solid articles conformed according to plastic technology, and to the articles.

27 Claims, No Drawings

COLLAGEN POWDER AND COLLAGEN-BASED THERMOPLASTIC COMPOSITION FOR PREPARING CONFORMED ARTICLES

FIELD OF INVENTION

The present invention relates to a new collagen-based technology and, in particular, to a new collagen-based precursor, to the process for its preparation, and to its use in the preparation of an homogeneous collagen-based composition performing like a thermoplastic. The present invention also relates to solid shaped articles conformed from said thermoplastic composition, and to the processes for their manufacture.

BACKGROUND OF THE INVENTION

Collagen is one of the most successfully applied proteins, used, amongst other fields, in food industry as a film forming protein yielding flat or tubular edible and/or biodegradable films used as wrapping material in food packaging. Collagen is the generic term for a family of proteins, representatives of which can be found in any multicellular organism. To date, more than 20 different types of collagen have been described in the literature. For industrial purposes there are collagen sources which are particularly favorable for the recovery of collagen from the point of view of availability, tissue architecture and economy. One such source is bovine hide.

One of the most prominent current collagen-based technology is related with the manufacture of sausage casings based on collagen. This technology strongly tries to prevent the collagen fibers from losing their native molecular structure, since a substantial part of processing success and the mechanical properties of the resulting collagen tubular or flat films, depend on its fibrillar structure. Thus, a main objective of this technology is the preservation of the fibrous collagen structure, during all industrial steps of extracting and purifying the collagen from raw animal tissues, like bovine hide or porcine skin. Therefore, there exist in the state of the art carefully designed processes wherein, doughs of highly hydrated, basically intact acid swollen collagen fibers are obtained, that can be extruded into flat or tubular films. It is well known that the temperature control during collagen dough preparation and in extrusion is a very important factor to prevent the collagen fibers from hydrolyzing and, therefore, from gelatinizing.

Although acid swollen aqueous doughs of fibrous collagen have shown excellent properties in making films by extrusion at low temperatures, the huge dough viscosity, even at low solids (collagen) concentration, causes this material not to show rheological properties that would allow it to be readily processed by conventional extrusion equipment known from processing plastics. U.S. Pat. No. 3,123,482 and U.S. Pat. No. 3,346,402, for example, may give an impression on how complex and specialized extrusion equipment and conditions used in collagen casing manufacturing are.

Moreover, after passing through the orifice at the outlet of the extrusion head, the tubular or flat film formed from the collagen dough must be stabilized by coagulation and drying, what means that a large amount of water has to be removed from the shaped gel, resulting in high energy costs. Within such a process, collagen fibers are physically oriented and in many cases on-line or in a posterior chemical treatment crosslinked to yield a three dimensional matrix with a network structure of irreversibly embedded fibrils. This, on the other hand, presents the disadvantage that a product obtained by this kind of technology may not be recuperated and re-utilized in repeating the process. In addition, any other molded three-dimensional article different from those obtained by extrusion into films, tubes or strings are unfeasible, unless they are intended as soft hydrated goods, such as collagen soft fishing baits and lures, or optical lenses, since upon drying and in curing processes, said molded three-dimensional article shrinks dramatically until losing their original shape. Moreover, highly hydrated dispersions of fibrous collagen, although being useful in their classical forms of application, they do not have properties suitable to form three-dimensional solid articles by conventional thermoplastic processing techniques like heat extrusion and injection molding without running the risk of hydrothermally hydrolyzing the collagen to such an extent as to render very diluted gelatin solutions. As a result, solid collagen-based molded articles with a low level of water content have not yet been successfully achieved.

Thus, collagen-derived hydrogels, although capable to perform like thermoplastic materials, do not have the structure, stability or strength to perform like a solid molded article; even when they are dried, with the resulting expenditures, they will not perform stable under wet conditions.

Another collagen based technology, is characterized by the degradation of the collagen into gelatin, animal glues and hydrolyzates. Such hydrolysis products derived from collagen, differing in their degree of hydrolyzation, are used in a wide variety of industries as a food, as cosmetic ingredients and animal glues. According to this technology, collagen molecules are hydrolyzed, by enzymatic attack or heat treatment of an acidic or alkaline dispersion of fibrillar collagen in water, until the basic structural units are destroyed to yield a gelatin. The average molecular weight of these new peptic products is variable, and always below 500 kD. For practical purposes, the main characteristic of gelatin is its ability to generate physical hydrogels, even at very low solid concentration, which are thermo-reversible at temperatures around 40° C. This ability entails certain advantages in handling and molding processes since gelatin hydrogels can be heated over the melting point to be poured or injected into a mold, and next solidified by cooling. However, its gel toughness and strength is low and depends on the water content and on the degree of crosslinking. In the attempt of forming shaped articles, technical problems also arise from the extensive shrinkage that occurs during the drying of the hydrated product. Fabrication of molded articles consisting of gelatin or gelatin hydrolyzate with an average molecular weight of less than 3 kD is impossible.

Some new processes have been proposed to transform gelatin into a thermoplastic-like product for molding articles (see U.S. Pat. No. 4,992,100 and U.S. Pat. No. 5,316,717) by plasticizing a powdered gelatin, with the addition of water, into an extrusion device and submitting it to high temperatures and shear forces, to produce a flowable homogenous melt that, after drawing-off from the slotted die of the extruder, can be granulated. Granulates can be processed like a thermoplastic-like product, which presents the advantage of working at low water content and preserving some gelatin properties, whereas the shrinkage of the molded articles manufactured with said granulates is very slight and is settable by the addition of additives, for example, plasticizers. Nevertheless, gelatin is a product to be manufactured first from collagen, with the consequent production and acquisition cost. Moreover, its molecular structure entails a poor behavior upon aging of molded articles or under wet conditions, what has led to the consequence that in reality it has, to our knowledge, never found industrial application in molding articles.

In order to shorten the process of manufacturing gelatin and glue precursors (also called glutinous materials), another process has been proposed in German patent number DE 19712400. This process starts from a collagen-rich raw-material, and is capable of avoiding all those wet and thermochemical, time consuming, highly cost-operative and formerly required steps, by accomplishing the steps of: a) grinding the collagen raw-material to fibers; b) bringing this material to a moisture content of 5%-40%; c) subjecting the wet material for no longer than 60 min and under introducing heat to shear forces until the fibers lose their native three dimensional structure, to render an essentially homogeneous hydroplastic mass, with the main component having an average molecular weight of at least 500 kD and which is totally or partially soluble in water at above 45° C.; d) processing that hydroplastic mass to form a granulate, strands or sheets capable of being directly processed to gelatin or glues. Those materials are considered as precursors of gelatin and glues and they have a hard and brittle consistency, are somewhat soluble in warm water and are not able to form flexible films and articles which could substitute the performance of today's existing collagen films.

One important advance in the search for new industrial applications of collagen as a biodegradable and (in principle) edible material, would be to achieve a new technology for molding articles, starting from native collagen without requiring the prior manufacture of gelatin. Therefore, an important advancement in manufacturing collagen-based goods, such as extruded tubular or flat films and molded solid articles, would be the development of a process capable of avoiding the step of manufacturing a precursory plastic "wet" mass based on acid- or alkali-swollen aqueous dispersions of collagen fibers. That type of gel-like dispersions suffer from elevated production costs, low flowability (high viscosity), consequently difficult to process and the need of removing the water after molding and/or extrusion.

In view of the above stated there is the need in the art of an alternative collagen-based technology for the production of collagen-based goods of different shapes including flat or tubular films and three-dimensional articles of different shapes and sizes. Advantageously said technology should avoid, on one hand, the manufacture of gelatin intermediates associated with time consuming and high costs processes. On the other hand said technology should also avoid the disadvantages associated with the use of native collagen above stated, and the disadvantages associated with aqueous dispersions of collagen fibers which are difficult to process as above mentioned.

There is therefore the need in the state of the art of a new collagen-precursor which can be used in the preparation of a collagen-based composition performing like a thermoplastic.

There is also the need of an alternative collagen-based composition which may advantageously, be processed by conventional plastic techniques known in the art, and is suitable to be conformed into solid shaped articles which are edible and biodegradable. Moreover said articles are thermosealable, and show improved properties over collagen-based articles known from the state of the art such as, among other, resistance to water, tensile strength, minimal shrinkage of the conformed articles.

SUMMARY OF THE INVENTION

It is therefore a primary object of the present invention the provision of a collagen precursor for use in a new collagen-based technology. The inventors have surprisingly discovered that it is possible to prepare a dry collagen powder, as collagen precursor. When this dry collagen powder is mixed with water and subjected to adequate conditions of shearing forces, temperature, and pressure an homogeneous collagen-based composition is obtained which behaves advantageously as a thermoplastic. This composition can be therefore processed according to common plastic processes and conformed into improved solid articles. Thus another object of the present invention is a process for preparing said collagen precursor, being a dry collagen powder.

A further object is the provision of an homogeneous thermoplastic collagen-based composition compounded from the dry collagen powder, for use in the manufacture of solid shaped articles.

A further object is a solid shaped article conformed from the homogeneous thermoplastic collagen-based composition.

It is yet a further object of the invention to provide a process for manufacturing the homogeneous thermoplastic collagen-based composition of the invention. Still another object is the provision of a manufacture process of a solid shaped article.

DETAILED DESCRIPTION OF THE INVENTION

The present invention provides a dry collagen powder as precursor suitable for the preparation of an homogeneous thermoplastic collagen-based composition. This dry collagen powder, hereinafter the dry collagen powder of the invention, is based on a fibril forming collagen being denatured or partially denatured, presenting an average molecular weight of at least 500 kD, a solubility equal to or greater than 25% in water at 60° C. and an average particle size comprised between 30 μm and 350 μm. In a preferred embodiment the dry collagen powder of the invention presents an average particle size comprised between 50 μm and 100 μm.

The term "fibril forming collagen" includes collagen type I, type II, type III, type V, type IX and mixtures thereof.

The term "partially denatured" as used in this description means a degree of collagen denaturation of at least 30%, more preferably greater than 70% and most preferably greater than 90%. Denaturation can be easily determined by means of Differential Scanning Calorimetry (DSC) by rehydration of a collagen sample overnight with water; introduction of the product so obtained into a DSC pan, which is tightly sealed and recording of the DSC with a heating rate of 5 K/min. For a fully native collagen a peak is observed in the DSC plot at about 60° C., while for a fully denatured collagen no peak is observed near 60° C. and no or only a small peak is observed between 25° C. and 40° C. From the relative areas underneath the peak near 60° C. an assessment can be made with respect to the degree of denaturation of the collagen sample.

As used in the description the term "dry" means a water content, expressed in percentage of weight referred to the total weight of the dry collagen powder, comprised between 3 wt-% and 15 wt-%, preferably between 6 wt-% and 10 wt-%.

The dry collagen powder of the invention is obtained by the following process, which is also another object of the present invention. Said process comprises the following steps:

a) mincing a collagen raw material to cylindrical particles;
    b) drying said cylindrical particles at a temperature equal or above the denaturation temperature of the collagen until the complete cross section of the individual particles are dried and brittle;
    c) milling the particles obtained either from step b);
    d) obtaining the dry collagen powder of the invention.

The collagen raw material is "based on a fibril forming collagen", regardless of the origin of the tissue from which it is recovered. According to the invention collagen raw material includes native collagen, and chemically or enzymatically modified fibril forming collagen. The collagen raw material suitable for putting in practice the present invention may be obtained from any adequate collagen source comprising a tissue, such as skin, hide, ossein derived from bones, tendons, innards and cartilage, from animals comprising bovine, porcine, calf, lamb, sheep, goat, horse, kangaroo, camel, chicken, ostrich, crocodile, and fish like salmon and herring. In a preferred embodiment hide or skin are used which are known in the state of the art for being particular favourable for the recovery of collagen from the point of view of availability, tissue architecture an economy for industrial purposes. In a preferred embodiment said tissues are selected from bovine hide and porcine skin.

Collagen sources are generally pretreated by processes known in the art to obtain the collagen raw material. In this sense collagen sources are not directly used as such in the collagen industries, but they are firstly purified by mechanical and/or chemical treatments known in the art. In a particular embodiment, said mechanical and/or chemical treatments are those typically employed in tanneries. One example of a simple mechanical purification step is the splitting of porcine skin in order to remove the highly fat loaded inner part of porcine skin as described in patent application WO 2004/073407. Another example of a typical employed chemical treatment are the ones carried out in tanneries to do the dehairing of bovine hide or the combination of alkaline and acidic process steps administered to bovine hide splits in the course of their purification for use in manufacturing edible sausage casings as described in DE 972854.

The necessarily degree of purification of the collagen raw material achieved by these mechanical and/or chemical treatments will depend on the requirements related with the further processing of the collagen raw material. According to the present invention the degree of purification of the collagen raw material will depend on the requirements related with the collagen based solid shaped article to be obtained, as it will be described further below.

Preferred collagen raw materials are unlimed hides, limed hide splits, pelts of bovine skin and splits of porcine skin.

In a more preferred embodiment of the invention, said collagen raw material are limed bovine hide splits like those used in collagen sausage casing manufacture or in the gelatin industry, which are readily available from tanneries.

Step a) of the process above defined comprises mincing the collagen raw material to cylindrical particles.

The term "cylindrical particles" refers to worm-shaped strands with a diameter of their cross-section of about 2 mm.

This step a) is carried out using an adequate equipment known to the person skilled in the art, such as the one typically used in the collagen sausage casing manufacture. In a particular embodiment said equipment is a grinder, such as a Wolfking grinder.

In a particular embodiment step a) comprises soaking limed bovine hide splits or pelts as the collagen raw material, in water at room temperature in a tanning drum, until the collagen raw material is completely saturated; draining off the soaking water; mincing the rehydrated collagen raw material into pieces having a diameter of about 10 mm; passing the material thus obtained under high pressure through a series of plates with holes, the last disc having holes with a diameter of 2 mm; recovering the resulting minced material consisting of cylindrical particles. Cooling of the equipment is adjusted such, that the temperature of the collagen material does not exceed about 50° C.

Step b) is carried out at a temperature high enough to denaturate or partial denaturate the collagen material by any adequate heating means known in the art. The denaturation temperature of collagen, which is usually equal or higher than about 65° C., is known from the art to depend from factors like the water content, the presence or absence of hydrotropic additives like calcium chloride, urea and the like, and the degree of natural crosslinking. According to this step b) collagen is denaturated or partially denaturated to a degree of at least 30%, preferably greater than 70%, and more preferably greater than 90%. In a particular embodiment step b) is carried out by air drying the cylindrical particles obtained from step a) at a temperature comprised between 60° C. and 80° C. Any adequate equipment may be used in step b). In a further particular embodiment, step b) is carried out in a furnace, such as a hearth-type furnace. Typically the cylindrical particles are dried after 16 hours at 80° C. in a furnace as described in Example 1. Step b) is carried out under conditions that provide cylindrical particles showing a complete cross section being dry and brittle, showing a water content in wt-% comprised between 3 wt-% and 15 wt-%, preferably between 4 wt-% and 8 wt-%.

Inventors have surprisingly found that particles submitted to step b) reach a suitable degree of brittleness, which has been found to be a prerequisite for milling the cylindrical particles into a sufficiently finely milled collagen powder according to the present invention, showing a particle size comprised between 30 µm and 350 µm, preferably between 50 µm and 100 µm. Inventors have also found, on the other hand, that particles dried under mild conditions such as at ambient temperatures still show a collagen non-denaturated fibrillar structure, and do not achieve the required degree of brittleness to be further milled into a powder with particles having the preferred size.

Finally, step c) of the process is carried out by finely milling the dry and brittle particles obtained form step b) to obtain the dry collagen powder of the invention, with an average particle size comprised between 30 µm and 350 µm, preferably between 50 µm and 100 µm. Milling can be carried out by means of any adequate equipment known in the art, such as a turbo rotor mill (TMR, Görgens Company, Germany). The particle size distribution of the dry collagen powder can be varied by setting different rotation speeds of the turbo rotor. In a particular embodiment, at a flow-rate from 200 g/min through the mill and a rotation speed of 4221 rpm of the turbo rotor the average particle size of the powder is found to be lower than 60 µm.

In a particular embodiment of the process for the preparation of the dry collagen powder of the invention, previous to step a), the collagen raw material, may be pretreated to achieve the denaturation or partial denaturation of the collagen. Accordingly, the collagen raw material is washed before further processing and its denaturation or partial denaturation is achieved by conventional heating or, for example, by means of microwave heating of the washing water to a temperature above the denaturation temperature of the collagen for a time comprised typically between 10 to 120 minutes. The collagen material obtained is then further minced, dried until the cylindrical particles turn brittle and milled according to the process above described. For the process of the preparation of the dry collagen powder of the invention it is important that the collagen raw material is denaturated or partially denaturated, in order to achieve the suitable degree of brittleness as above mentioned in connection with step b). This denaturation may take place before step a) is carried out or during either step b).

The dry collagen powder of the invention, prepared according to the process above described, may then be stored under adequate conditions such as in an adequate storage tank. Under storage, the dry collagen powder of the invention may take up water. For instance, under typical storage conditions of 22° C./60% relative humidity and during 48 hours, the dry collagen powder takes up to about 7 wt-% of water. Alternatively, the dry collagen powder may be directly further used in the preparation of an homogeneous collagen-based thermoplastic composition, which is another object of the present invention.

Therefore, a further object of the present invention is the use of the dry collagen powder of the invention in the preparation of an homogeneous thermoplastic collagen-based composition. In this sense inventors have surprisingly found that a dry collagen powder showing an average particle size equal or below to 350 μm, is required to prepare an homogeneous collagen-based thermoplastic composition.

A further object of the present invention is an homogeneous thermoplastic collagen-based composition, hereinafter the composition of the invention, comprising the dry collagen powder of the invention and water. As used herein and unless otherwise stated, percentages of the components are expressed in weight and are referred to the weight of the total composition of the invention. In a particular embodiment the composition of the invention, comprises about 20 wt-% to about 95 wt-% of the dry collagen powder of the invention and about 5 wt-% to about 80 wt-% of water, preferably about 50 wt-% to about 85 wt-% of the dry collagen powder of the invention and about 15 wt-% to about 50 wt-% of water, and more preferably about 60 wt-% to about 75 wt-% of the dry collagen powder of the invention and about 25 wt-% to about 40 wt-% of water.

In a preferred embodiment, the composition of the invention comprises further an additive being a plasticizer. Plasticizers useful in the composition of the invention include but are not limited to polyols and higher molecular weight alcohols, for example, glycerol, propylene glycol, sorbitol, butanediols, ethylene glycol, diethylene glycol, triethylene glycol, low molecular polyethylene glycols and polypropylene glycols, and mixtures thereof. In a more preferred embodiment said plasticizer is glycerol. In a particular embodiment of the invention said plasticizer is present in an amount comprised between about 5 wt-% and about 50 wt-%.

In general, plasticizers may function as water-binding humectants within the composition of the invention, avoiding it from drying out during handling and storage of it at the open air. However, some plasticizers may not only act as humectants but as plasticizers by themselves, to provide certain properties such as plasticity, flexibility, processability and elasticity to the composition of the invention and/or to the articles conformed from the composition of the invention.

Plasticizers acting as water-binding humectants may prevent a solid shaped article obtained from the composition of the invention as further below described, from drying out below a desired water content. Generally, the drier the solid shaped article based on the composition of the invention is, the less flexible and the more brittle it is. Thus, by adjusting the water content of the composition in question, the mechanical properties of the solid shaped article can significantly be influenced. One way of achieving such adjustment is to add the precise amount of water to the composition of the invention and, after having manufactured the solid shaped article, packing said article in a vapor impermeable packaging to avoid loss of water if necessary. Another possibility is to introduce an effective amount of a plasticizer into the composition of the invention acting as a humectant retaining the desired water content in the solid shaped article obtained, avoiding it from drying out.

In a preferred embodiment the composition of the invention comprises: (i) about 40 wt-% to about 65 wt-% of the dry collagen powder of the invention; about 20 wt-% to about 40 wt-% of water; and about 10 wt-% to about 20 wt-% of a plasticizer. In a more preferred embodiment said plasticizer is glycerol.

The composition of the invention may further comprise one or more other additives selected from the group of proteins, biodegradable polymers, blowing agents, modifiers, fillers, lubricants, crosslinkers, preservatives, colorants, flowability improvers, flavouring agents and scents, nutritional agents and their mixtures. Said additives may be added to modify or regulate properties of the solid shaped articles of the invention which are further below described.

Suitable proteins are selected from an animal derived protein, a plant derived protein, a microbial protein and their mixtures. In a particular embodiment of the invention the collagen powder content of the composition of the invention, referred to the total protein content, is comprised between about 30 wt-% to about 100 wt-%, preferably about 50 wt-% to about 90 wt-%. In a preferred embodiment the dry collagen powder content is more than 50 wt-% of the total protein content. Animal derived proteins include, but are not limited to, caseins or whey proteins derived from milk, albumin derived from blood or egg, egg white, gelatine, keratin, elastin and their mixtures. Plant derived proteins include, but are not limited to, soya, gluten, gliadin, glutenin, zein, legume proteins, alfalfa protein, proteins isolated from peas, cottonseed, sunflowerseed, lupinseed and the like, cereal-derived proteins and their mixtures. In a preferred embodiment gluten is used. Furthermore, microbial proteins are suitable to be an additive of the composition of the invention. In a particular embodiment yeast protein is added to the composition of the invention.

A biodegradable polymer may be added to the composition of the invention to regulate the mechanical or degradability properties of the solid articles of the invention described further below. Suitable biodegradable polymers are natural or synthetic thermoplastics including a polyhydroxyalkanoate, such as a polyhydroxybutyrate (PHB) or a copolymer such as a polyhydroxybutyrate-valerate (PHBV), a polyalkylenesters, a polylactic acid (PLA), a polylactide (PLLA), a poly-ϵ-caprolactone (PCL), a polyvinyl ester, a polyvinylalcohol and their mixtures.

Blowing agents are also suitable to be used in the composition of the invention. A blowing agent may be added to the composition of the invention to form low ratio expanded foam solid shaped articles which are further below described. Water can function as a primary blowing agent, but physical and chemical blowing agents are preferably used as auxiliary blowing agents. Physical blowing agents include but are not limited to inert gases like nitrogen, carbon dioxide or rare gas; and agents which are liquid at ambient temperature and have low boiling points, like, alcohols such as ethanol, 2-propanol, hydrocarbons such as butanes, or combinations thereof. Chemical blowing agents are in general more difficult to control than the physical agents, which are therefore preferably used in the process. Said chemical agents include but are not limited to ammonium carbonate, sodium hydrogen carbonate, sodium azide and combinations of acids and carbonates known to the skilled person in the art. In a particular embodiment the blowing agent is a compressed gas which is mixed and dispersed in the composition of the invention. In a particular embodiment said agent is carbon dioxide. A preferred concentration of carbon dioxide is about 0.2 wt-% to about 5 wt-%, based on the weight of the composition of the invention. The carbon dioxide dissolves within the composition of the invention.

Modifiers can be added to the composition of the invention and are used to improve certain mechanical properties of the solid shaped articles of the invention, such as elasticity, tear strength and other properties related with textural and organoleptic features. In a particular embodiment, a modifier is added in the case of some edible or chewable solid shaped articles conformed from the composition of the invention, to increase the animal acceptance. Modifiers may also be used to improve some processing properties, such as foaming performance. Typical modifiers which can be used in the composition of the invention include, but are not limited to, synthetic polymers, such as polyvinyl alcohol, polylactic acid, poly (caprolactone), poly(esteramide), natural biopolymers, such as gums and other hydrocolloids.

Fillers may be added to improve the mechanical properties, and to provide structural reinforcement of solid shaped articles conformed from the composition of the invention as further below described. Fillers reduce, in general, the costs of their manufacture. In a particular embodiment the composition contains about 1 wt-% to about 25 wt-% of a filter, preferably about 5 wt-% to about 20 wt-%, more preferably about 10 wt-% to 15 wt-%. Preferably, the filler is selected from a cellulose derivative, a fibrillar, crosslinked collagen, a cellulose fiber; a native starch, a chemically or physically-modified starch, inorganic materials, like calcium carbonate and silicium dioxide, and their mixtures.

A lubricant may be added in an effective amount to provide a mold- or dye-lubricating effect when the composition of the invention is conformed into the desired solid shaped article, for example, by aiding in the release of the conformed solid shaped article from the mold. Water-insoluble lubricants may also increase the water-resistance of the solid shaped articles of the invention. Examples of suitable lubricants that may be used in the compositions, include, but are not limited to compounds known to the skilled person in the art such as soybean oil, rapeseed oil, sunflower oil, palm oil, phospholipids such as lecithin, mono- and diglycerides of fatty acids, preferably saturated fatty acids; vegetable oil, preferably hydrogenated, phosphoric acid-derivatives of the esters of polyhydroxy compounds, animal lipids, preferably hydrogenated to prevent oxidation, mineral oils, and the like, and their mixtures. Preferred lubricants are soybean oil and lecithin. In a particular embodiment the amount of lubricant included in the composition of the invention is about 0.1 wt-% to 10 about wt-%, preferably about 0.5 wt-% to about 5 wt-%.

Crosslinkers may provide a higher degree of mechanical strength to the solid shaped articles prepared from the composition of the invention. Examples of useful crosslinking agents ("hardeners") which may be added in an amount of from about 0.05 to about 5 wt-%, include, but are not limited to formaldehyde, dialdehydes like glutardialdehyde or glyoxal, dialdehyde starch, molecules with multiple aldehyde functions known to the skilled person in the art, diisocyanates, like hexamethylene diisocyanate, carbodiimides, such as N,N-(3-dimethylaminopropyl)-N'-carbodiimide hydrochloride, cyanimid, polyglycidyl ethers, like 1,4-butanediol diglycidyl ether, reducing sugars like ribose, polyepoxy compounds, dicarboxylic acids, dimethyl suberimidate, diphenyl phosphoryl azide, chlorotriazine, genipin, and acrolein.

Crosslinking may also be achieved enzymatically e.g. by using transglutaminases or other suitable enzymes known to the person skilled in the art.

Preservatives may be also included in the composition of the invention. A compatible antimicrobial agent such as a fungicide or bactericide may also be included in an amount effective to prevent growth of microorganisms in the composition of the invention and in the solid shaped article conformed from the composition of the invention. Examples of useful preservatives include, but are not limited to, propionic acid, sorbic acid and their sodium or potassium salts, parabens, benzoic acid and/or benzoates known in the state of the art, acetic acid, vinegar, sodium diacetate, lactic acid, and mixtures thereof. The composition may include about 0.05 to about 0.3 wt-% of a preservative.

The composition of the invention may further include a coloring agent. Coloring agents suitable for use in the present compositions include, but are not limited to, synthetic dyes such as Bismarck Brown 2R and Direct Green B; natural coloring agents such as chlorophyll, xanthophyll, carotene, saffron, kermes, curcuma, cochenille and indigo, typical food colorants like annatto, carmin, erythrosine, tartrazine, allura red, sunset yellow, and metallic oxides such as iron and titanium oxides. In a particular embodiment, about 0.01 to about 10 wt-%, preferably about 0.5 to about 3 wt-% of a coloring agent is included in the composition of the invention.

Flowability improvers like organic acids such as citric acid may also be added. They influence the rheological properties of the composition of the invention which, as further below explained, is manufactured under shearing forces, pressure and temperature conditions. The impact on the rheological properties is interpreted as an on-line acidic partial hydrolysis of the protein present in the composition of the invention. In a particular embodiment about 0.1 wt-% to about 10 wt-%, preferably about 0.5 wt % to 5 wt-% of citric acid is added.

Flavouring agents and scents and their mixtures may de added to the composition of the invention, and include, but are not limited to, an edible flavoring agent such as cocoa, vanillin, fruit extracts, such as strawberry and banana, and the like, smoked colorant caramel, bacon, among others. They enhance the taste of the edible composition of the invention. In a particular embodiment a coloring agent appropriate to the flavouring agent is used. The composition of the invention may comprise a nutritional agent as for example vitamins or minerals.

A preferred composition of the invention consists of about 56 wt-% of dry collagen powder; about 24 wt-% of water; about 17.5 wt-% of glycerin; and about 2.5 wt-% of citric acid.

Another preferred composition of the invention consists of about 50 wt-% of dry collagen powder; about 25 wt-% of water; about 15 wt-% of glycerin; about 5 wt-% cochenille powder and about 5 wt-% of ethanol.

Another preferred composition of the invention consists of about 50 wt-% of dry collagen powder; about 25 wt-% of water; about 15 wt-% of glycerin; about 5 wt-% of wheat gluten; about 2 wt-% of cochenille powder; about 2 wt-% of vanilla flavour; and about 1 wt-% of citric acid.

Another preferred composition of the invention comprises dry collagen powder; about 15 wt-% of water comprising about 10 wt-% based on water of colorant caramel; about 10 wt-% based on water of flavour bacon; and about 6 wt-% based on water of scent smoked colorant caramel; about 20 wt-% of glycerin; and about 2.5 wt-% of citric acid.

Another preferred composition of the invention consists of about 50 wt-% of dry collagen powder; about 25 wt-% of water; about 20 wt-% of glycerin; and about 5 wt-% of ethanol.

Another aspect of the invention relates to a process for the preparation of the composition of the invention. According to the process, the composition of the invention may be prepared in the form of a mass or in the form of solid pellets. The process comprises the following steps:

(i) mixing the dry collagen powder of the invention and water;

(ii) subjecting the in step (i) obtained mixture of the dry collagen powder and water at shearing forces, temperature, and pressure conditions until the components are transformed into an homogeneous thermoplastic collagen-based composition which is in form of a mass; and optionally (iii) transforming said homogeneous thermoplastic collagen-based composition in form of a mass, in to pellets.

In step (i) dry collagen powder obtained according to the process above described is contacted and mixed by any adequate means with water. The amount of water is calculated to achieve the weight percentages of the composition of the invention, taking into account that the dry collagen powder may contain remaining water or may take up water upon storage. In a particular embodiment dry collagen powder and water are first contacted and manually mixed, are then transferred to a fast lab mixer where they are further mixed until a grainy agglomerate is obtained (see Examples 2 and 3a). The grainy agglomerate may then be further processed according to step (ii) for obtaining the homogeneous thermoplastic collagen-based composition of the present invention.

In step (ii), by subjecting the mixture of the dry collagen powder and water obtained in step (i) to shearing forces under adequate conditions of temperature and pressure, the mixture is transformed into an homogeneous thermoplastic collagen-based composition in form of a mass. The processing conditions can be readily varied by the skilled person in the art, to achieve effective mixing and the transformation into an homogeneous thermoplastic collagen-based in form of a mass.

The process for the preparation of the composition of the invention comprises optionally, step (iii) of transforming said homogeneous thermoplastic collagen-based composition in form of a mass, into pellets, which are solid. The composition mass is accordingly extruded through the discharge port or a die, into air or other gaseous medium. The extrudate is then sectioned into pellets of desired size, either dried or allowed to adjust their moisture content cooled and stored for later use if required. The extruded mixture solidifies within a few minutes, depending, for example, on the size of the extruded portion, the ingredients of the composition of the invention, the temperature of the composition, and other factors. In a particular embodiment, endless strands of said mass are extruded through one or several slotted dies, preferably dies with a circular cross section, provided on the extruder and, after cooling-down in an air current, are pelletized by granulators or strand granulators into pellets commonly used in the state of the art for processing plastic materials, to the same or different pellet size. The pellet size is typically comprised between about 0.1 and 10 mm, preferably above 1 mm and more preferably above 2 mm. Thus, solid pellets can be stored and, conformed, later, into solid shaped articles. In a preferred embodiment said pellets are stored in an hermetically sealed bag.

The process for the preparation of the composition of the invention may be carried out by an adequate high shear kneader system. In a preferred embodiment the process is carried out in an extruder selected from a single screw extruder and a twin screw extruder, preferably a twin screw extruder. Suitable twin screw extruders are co-rotating twin screw extruders such as Krupp Werner & Pfleiderer ZSK25, or the AVP twin screw extruder Type MP 19 TC. As single screw, an extruder such as a Rheomex 302 may be used.

The process for the preparation of the composition of the invention may further comprise the addition of one or more additives selected from plasticizers, proteins, biodegradable polymers, blowing agents, modifiers, fillers, lubricants, crosslinkers, preservatives, colorants, flowability improvers, flavouring agents and scents, nutritional agents and their mixtures as above described. The selection of the additive or additives and their amounts added can be varied depending on the desired properties of the solid shaped article to be conformed from the composition of the invention.

The additive or additives may be simultaneously or separately added at any time during the process of the invention or before the process. In this sense, the additive or additives may be already added to the dry collagen powder, or may be added to the water, before they are contacted in step (i). The additive may be added in step (i) together with the dry collagen powder and the water, or it may be added later during step (ii) at any time. The additive is homogeneously integrated into the homogeneous thermoplastic collagen-based composition which may be obtained in form of a mass, or in form of pellets as in examples 3b), 3 c) and 4). More than one additive may be added independently at different stages and in different ways as above explained.

In a particular embodiment the components of the composition of the invention including dry collagen powder, water and, optionally, one or more additives are mixed before feeding them to a single screw extruder.

In other particular embodiment the dry collagen powder is fed to a twin screw extruder equipped with side feed hoppers allowing the separate addition thereto, of variable amounts of water, as desired, and one or more additives. In another particular embodiment, desired amounts of the selected additives may be admixed to the dry collagen powder at special metering locations. Other additives may be fed into the extruder from individual hoppers in predetermined sections of the twin screw extruder. In a particular embodiment the process is carried out in a continuous mixing system.

As above mentioned in relation to the process for the preparation of the dry collagen powder of the invention, the dry collagen powder may be stored in an adequate storage tank after its preparation. Thus, in a particular embodiment the dry collagen powder is then conveyed from said storage tank at a constant conveying rate into the high shear mixing system, preferably an extruder. In a zone adjacent to the feeding of the dry collagen powder, water is added in an adequate proportion to achieve the desired content of water, by means of a metering pump adjusted to the flow of the dry collagen powder.

Depending on the selected amounts and the selected components to be processed according to the process of the invention, different processing times are necessary, to prepare the homogeneous thermoplastic composition of the invention. In a particular embodiment the mixture of components is processed in an extruder for a period of time typically comprised between 2 seconds and 5 minutes, preferably between 5 seconds and 3 minutes.

Suitable operating temperatures are comprised between 30° C. and 160° C., preferably between 75° C. and 90° C. During the transformation into a thermoplastic composition, a pressure of between 20 bar and 350 bar, preferably from 30 bar to 100 bar is exerted on the mixture.

In general, processing conditions such as the temperature distribution along the extruder, pressure, screw speed and configuration, feed rate of the dry collagen powder, of water and additives, and throughput rate can be readily controlled by the skilled person in the art.

The composition of the invention shows a behaviour similar to a thermoplastic material and a suitable flowability to be conformed or molded into articles by conventional thermoplastic processing techniques such as extrusion and injection molding.

Depending on the additives of the composition of the invention, it may be edible when it comprises only food-grade ingredients. Thus, the composition of the invention is adequate for the preparation of a variety of food articles. Besides, the composition of the invention is biodegradable, and/or recyclable and can therefore also be suitably used to obtain a great variety of low-cost conformed articles.

Thus, a further object of the present invention is the use of the composition of the invention in the manufacture of solid shaped articles. The composition of the invention obtained in form of a mass, may be subsequent to its preparation, directly further process to conform a solid shaped article by any molding technique known from the art. In an alternative embodiment the solid pellets obtained in step (iii) may be used to be conformed into solid shaped articles. This alternative presents the advantage that the pellets may be stored and conformed later into articles.

Thus a further object of the invention are solid shaped articles conformed from the composition of the invention of many different shapes, sizes and dimensions that find multiple applications in a great variety of fields. A shaped solid article, includes, but is not limited to, an outdoor sport article, such as golf tees; a sheet; a bag, like a garbage bag; a tray; a bottle; a tubing; dishware, comprising a cup, a plate, a dish; a flatware comprising a knife, a fork, a spoon, or another eating utensil; a pet-toy; a pet-chew; a food article comprising a candy, a sweet, a snack food; animal food; a flat film; a tubular film; a fishing bait, a fishing lure; a wine gum type product; a foamed article; a packaging material for other articles; a lose fill packing pellet; a food packaging material and a container. In a particular embodiment, the pet-chew is a dog-chew conformed from a composition of the invention comprising additives which make the solid shaped article attractive for dogs. In a preferred embodiment the composition of the invention comprises an additive selected from caramel as colorant, smoked as scent and bacon as flavour and their mixtures, said composition being preferably conformed into a bone shape.

In a particular embodiment the shaped solid article is a flat or a tubular film, being thermosealable, thus, being particular useful for heat sealing by conventional thermo-sealing machines. The possibility of heat sealing films made from the composition of the invention turns out to be particularly advantageous, as heat sealing capability is a lacking property of collagen films prepared according to the classical collagen processing technology. This can be seen from comparative Example 12, wherein a tubular film conformed from a thermoplastic composition according to the present invention is thermosealable, whereas a commercially available collagen film "Coffi" (Naturin GmbH & Co. KG, Germany) is not weldable.

In a preferred embodiment the solid shaped article is a foamed article which is conformed from a composition of the invention comprising a blowing agent in a variety of shapes, dimensions and sizes which are suitable for different applications.

Advantageously, the solid shaped articles of the invention are edible when they are conformed from a composition of the invention consisting exclusively of food-grade ingredients that may be consumed at nontoxic levels by an animal, such as a mammal including humans, so that the solid articles of the invention may be safely consumed. The resulting edible products are, for instance, candies, sweets, and the like. In the state of the art, the corresponding products are usually based on gelatin and hydrocolloid mixtures, sugars and taste and/or flavoring agents. Such edible compositions of the invention are useful for making, for example, a food article for consumption by a human or other animal such as a snack food or a domestic pet or other animal food, and the like; a packaging article that may be consumed by the user along with the package contents, dishes and flatware that may be ingested following a meal. According to the present invention a solid shaped article may include a scent, an edible flavoring agent such as cocoa, vanillin, fruit extracts such as strawberry and banana, and the like, to enhance the taste of said edible article, and a coloring agent which may be appropriate to the flavor. The composition may also be nutritionally reinforced, as for example by the inclusion of vitamins or minerals.

The solid shaped articles of the invention are biodegradable. Thus articles such as containers, bags such as garbage bags, food service utensils, pet toys, golf tees and other articles may be discarded without contamination or damage of the environment. Moreover, solid shaped articles, such as for instance, used food packaging material and containers, can be thus collected and pasteurized, ground, and pelletized for animal feed, such as fish feed. As the compositions within the scope of the present invention have a high content of organic nitrogen, articles of the invention can be added to soil to improve or fertilize the soil.

Another object of the invention is a process for manufacturing a shaped solid article which comprises conforming the composition of the invention. In a particular embodiment, the composition of the invention in form of a mass as obtained in step (ii) is subsequently conformed into the desired solid shaped article in a so called single-step process. In an alternative embodiment, the process for manufacturing a shaped solid article comprises conforming the pellets as obtained in step (iii).

The solid shaped articles of the present invention may be manufactured by any conforming method known to the skilled person in the art related to plastic materials. Such methods include, but are not limited, to compression molding, blown film extrusion, blown film co-extrusion, blow molding, rotation molding, transfer molding, extrusion molding, co-extrusion molding, vacuum forming, pressure forming, inflation molding and injection molding. In a preferred embodiment the conforming method is injection molding. After the composition of the invention in form of a mass has cooled down and solidified, the molding unit is opened and a solid article having the shape of the mold cavity is obtained.

In a particular embodiment, a low-ratio expanded foam article conformed from the composition of the invention is prepared using a counter-rotating twin screw extruder equipped with a foam die. The twin screw extruder performs both the process for the preparation of the composition of the invention, and foaming extrusion functions. A useful single extruder suitable for the preparation of low ratio expanded foam is a Rheomex 302 extruder with a standard single screw and a foam die, L/D of 30:1. The foamed article may be conformed by any molding technique or extruded to provide foamed articles such as packaging materials, lose fills, foamed dishes and cups, and the like. In a particular embodiment, water present in the composition of the invention may be suitably used as a blowing agent. According to another particular embodiment of said process, carbon dioxide is pumped into a metering zone of a co-rotating twin screw extruder, such as the AVP TypeMP 19 TC, under the pressure of about 30 bar to 90 bar. The carbon dioxide dissolves within the composition of the invention. A currently preferred concentration of carbon dioxide is about 0.2 wt-% to 5 wt-%, based on the composition of the invention.

In a particular embodiment the composition of the invention is conformed into a flat film, the manufacturing process comprising (i) pressing out the composition through a slotted die, (ii) obtaining a primary film; (iii) rolling it out in a system of heated calendars until the desired wall thickness and the film width are achieved. In another particular embodiment the composition of the invention is conformed into a tubular film, the manufacturing process comprising (i) pressing out the composition through an annular die; and (ii) forming a tubular film by means of blown film extrusion. The so obtained tubular film may be mono- or biaxially oriented by means of technologies known from the manufacture of plastic tubes by the skilled person, such as the production of sausage casing from polyamide based films. In another particular embodiment the composition of the invention is conformed into a tape, the manufacturing process comprising (i) pressing out the composition through a flat die and forming a tape. In another particular embodiment the composition of the invention is conformed into a hollow body, the manufacturing process comprising (i) pressing out the composition through a parison die; and (ii) blowing it into a shape of a hollow body. In a further particular embodiment, the composition of the invention is conformed by the co-extrusion of two or more superposed either flat or tubular films, which can be differently fashioned in color, composition, and/or endowed with different chemical and/or physical properties, to make a multilayered flat or tubular film. The tubular film, in turn, can encase an inner part of the same or different nature which has been simultaneously extruded through the central orifice of the multilayer blown film die. Multilayered co-extruded films of thermoplastic composition can be obtained either by combining layers of different compositions of the invention, or by combining layers of the composition of the invention with other layers made up by either natural or synthetic polymeric materials.

Further, after a shaped solid article has been manufactured, it may optionally be submitted to a curing bath or a curing atmosphere known in the art, comprising a chemical crosslinker. Typical crosslinking agents used in a curing bath include, but are not limited to, formaldehyde, bifunctional aldehydes, transglutaminase, carbodiimides, certain polyvalent irons like $Fe^{3+}$, $Cr^{3+}$, $Al3^+$. A typical curing atmosphere comprises a gaseous crosslinking agent, such as acrolein. This curing process may confer different properties to the solid shaped articles conformed from the composition of the invention, such as for example a reduction in the swelling ability, an increase in water resistance, a modification of physical and/or mechanical properties to render them insoluble.

Advantageously, solid shaped articles conformed from the composition of the invention show high water resistance, are capable of tolerating exposure to water over an extended period of time. Articles made from the composition of the invention will degrade over time when exposed to moisture, originating, for instance, from the contents encased in said article such as meat or a meat emulsion, or from submersion in water or other direct contact with water, but articles remain substantially intact with minimal or no disintegration for a sufficiently extended period of time. Said time may be predetermined depending on the formulation of the composition of the invention selected to conform the solid shaped article, and to the optional curing treatment of the article.

The articles of the invention show a high level of tensile strength and elongation, high tear strength, high compressive strength, good resilience. In a particular embodiment articles manufactured by injection molding display a high degree of tensile strength of about 20 MPa and a percentage of elongation at breakage of about 200%. The shrinkage of the obtained molded solid shaped articles is very slight, and is settable via addition of additives, for example, crosslinkers and/or plasticizers in effective amount. Another advantage of the solid shaped articles of the invention can be seen in that they retain a light color which is desirable for consumer products. After being used, the solid shaped articles of the invention such as food utensils, dishes, and containers and the like, may also can be collected, pasteurized, ground, and made into products such as animal feed, soil conditioners, among others.

The foregoing is illustrative of the present invention. This invention however is not limited to the following precise embodiments described herein, but encompasses all equivalent modifications within the scope of the claims which follow.

EXAMPLES

Example 1

Preparation of the Dry Collagen Powder 10 kg of limed bovine hide splits are soaked in 30 l of water at room temperature in a tanning drum. The material is completely saturated in the course of 24 hours. Then the soaking water is drained off and the rehydrated collagen raw material is cut into pieces having a diameter of about 10 mm in a first mincing step. To achieve this degree of pre-comminution, the rehydrated collagen raw material is treated in a cutter during 1 minute. The pre-minced collagen raw material discharged from the cutter is transferred into a passing machine equipped with a breaker plate having holes with a diameter of 2 mm. The resulting minced material are worm-shaped strands with a diameter of their cross-section of about 2 mm The cylindrical particles obtained, are then stacked up in a layer of 3 cm on plates and put in a hearth-type furnace at 80° C. After 16 hours the complete cross section of the stacked particles is dry, having a residual water content of less than 7 wt-%. This dried material is brittle, which is a prerequisite for grinding it into a fine collagen powder. Via a twin screw feeder the brittle particles are fed into the hopper of a Turbo-Rotor-Mill (TRM; Görgens Company, Germany). The particle size distribution can be varied by setting different rotation speeds of the turbo rotor. At a flow-rate from 200 g/min through the mill and a rotation speed of 4221 rpm of the turbo rotor the average particle size of the powder is found to be lower than 60 µm.

Upon storage under ambient conditions (22° C./60% rel. humidity/48 h) the dry collagen powder takes up about 7 wt-% of water.

Example 2

Preparation of a Grainy Agglomerate Starting from a Fine Dry Collagen Powder and Water 700 g of the dry collagen powder obtained according to example 1 (with a residual water content of 7 wt-%) and 300 g water are added into a vessel and shortly mixed together manually. The resulting mixture is then transferred in a fast lab mixer (MSHK 25, Plasttechnik Company, Greiz). A knife rotates with 3000 rpm on the bottom of the fast lab mixer and causes an efficient mixing of the components. After 15 seconds the vessel is cleared through a discharging orifice at the bottom of the mixer. The result of the mixing process is a grainy agglomerate, which may be further processed according to step (ii) of the process for the preparation of the homogeneous thermoplastic composition of the invention.

Example 3a

Preparation of a Coarse Grainy Agglomerate Starting from a Fine Dry Collagen Powder, Water and Plasticizer An aqueous plasticizer solution is prepared by mixing 300 g of water and 175 g of glycerol in a vessel. Next, 700 g of the dry collagen powder manufactured according to example 1 (with a residual water content of 7 wt-%) are added to the aqueous plasticizer solution and all components are shortly mixed together manually. The mixture obtained is then transferred into a fast lab mixer (MSHK 25, Plasttechnik Company, Greiz). A knife rotates with 3000 rpm on the bottom of said mixer and causes an efficient mixing of the components. After 15 seconds the vessel is cleared through a discharging orifice at the bottom of the mixer. The result of the mixing process is a coarse, grainy agglomerate. The agglomerate obtained is stored away in a hermetically sealed bag in order to avoid loss of water.

This coarse grainy agglomerate is optionally further introduced in an extruder and further processed according to step (ii) of the process for the preparation of the thermoplastic composition of the invention in form of pellets.

Example 3b

Preparation of a Composition of the Invention Based on Dry Collagen Powder, Water and Plasticizer by Mixing the Individual Components in a Single Screw Extruder The dry collagen powder (p) prepared according to example 1 (with a residual water content of 7 wt-%) and the liquid components like water (w) and glycerol (g) are fed into the hopper of a single screw extruder (HAAKE RHEOMEX 302 single screw extruder (L/D=30)). The components are introduced in relative amounts p/w/g=55 wt-%/30 wt-%/15 wt-% at a total flow rate of 1 kg/h.

The individual components are mixed together by conveying them through the mixing zones along the extruder barrel. A homogenization section at the end of the screw causes an efficient mixing process. Along the barrel all heating zones are set to 90° C. The mixture is extruded through a pelletizing die into strands with a diameter of about 2 mm. The extruded strands are processed into pellets by a strand pelletiser (Modell Nr. 8 812 01, Brabender Company). During the process the extrusion pressure is 150 bar. The pellets obtained are stored away in a hermetically sealed bag in order to avoid loss of water.

Example 3c

Preparation of a Composition of the Invention Based on Dry Collagen Powder, Water and Plasticizer by Mixing the Individual Components in a Twin Screw Extruder The dry collagen powder (p) prepared according to example 1 (with a residual water content of 7 wt-%) is fed into the hopper of a twin screw extruder (APV twin screw extruder type MP19TC (L/D=40:1)). Water (w) and glycerol (g) are side fed via gear pumps at adjacent zones. The components are introduced in relative amounts p/w/g=55 wt-%/30 wt-%/15 wt-% at a total flow rate of 1 kg/h.

The individual components are mixed together by conveying them through mixing zones along the extruder barrel. Mixing elements of the twin screw at the metering zone cause an efficient mixing process. Along the barrel all heating zones are set to 90° C. The mixture is extruded through a pelletising die into strands with a diameter of about 2 mm. The extruded strands are processed into pellets by a strand pelletiser (Modell Nr. 8 812 01, Brabender Company). During the process the extrusion pressure is 180 bar. The pellets obtained are stored away in a hermetically sealed bag in order to avoid loss of water.

Example 4

Preparation of Pellets

One preferred composition of pellets is the following:
50 wt-% dry collagen powder (prepared according to example 1)
25 rut-% water
15 wt-% glycerol
5 wt-% of wheat gluten
2 wt-% cochenille powder (as a colorant)
2 wt-% vanilla flavor (as a flavoring agent)
1 wt-% of citric acid (to regulate the flow properties of the composition of the invention in form of a mass)

The pellets are prepared using a twin screw extruder. The dry collagen powder manufactured according to example 1 and all other solid components (wheat gluten, cochenille powder, vanilla flavor and the citric acid) are fed into the hopper at the feed section of a twin screw extruder (APV twin screw extruder type MP19TC (L/D=40:1)). Water and glycerol are side fed via gear pumps at adjacent zones so that all components are mixed and transformed into a thermoplastic mass in one continuous process. The temperatures along the barrel and the die temperature are set to 90° C. during the transformation into a thermoplastic mass and extrusion process. The rotation speed of the screws is set to 70 rpm. During the process the extrusion pressure is 180 bar. The mixture is extruded through a pelletising die into strands with a diameter of about 2 mm. The extruded strands are processed into pellets by means of a strand pelletiser (Modell Nr. 8 812 01, Brabender Company). The pellets obtained are stored away in a hermetically sealed bag in order to avoid loss of water.

Example 5

Use of Citric Acid to Regulate the Flow Properties of the Mass

Example 5a

Trial without Citric Acid

Pellets with the following composition are prepared according to any of the methods described in examples 3 or 4:
56 wt-% of dry collagen powder (prepared according to example 1)
24 wt-% of water
20 wt-% of glycerol The pellets obtained are then introduced into the hopper of a single screw extruder (HAAKE RHEOMEX 302 single screw extruder (L/D=30)) at a flow-rate of 1 kg/h. The single screw extruder is operated under steady state conditions. The temperatures along the barrel and the die temperature are set to 90° C. during the extrusion process. The rotation speed of the screw is set to 70 rpm. The transformed thermoplastic mass is extruded into a tape through a flat die (cross section of the die: 70 mm×0.8 mm). With the above settings the extrusion pressure measured at the end of the extrusion barrel is 350 bar.

Example 5b

Trial with Citric Acid

Pellets with the following composition are prepared according to any of the methods described in examples 3 or 4:
56 wt-% of dry collagen powder (prepared according to example 1)
24 wt-% of water
17.5 wt-% of glycerol
2.5 wt-% of citric acid The pellets obtained are then introduced into the hopper of a single screw extruder (HAAKE RHEOMEX 302 single screw extruder (L/D=30)) at a flow-rate of 1 kg/h. The single screw extruder is operated under steady state conditions. The temperatures along the barrel and the die temperature are set to 90° C. during the extrusion process. The rotation speed of the screw is set to 70 rpm. The thermoplastic mass is extruded into a tape through a flat die (cross section of the die: 70 mm×0.8 mm). With the above settings the extrusion pressure measured at the end of the extruder barrel is only 150 bar.

The presence of citric acid causes a lower viscosity of the thermoplastic mass during the extrusion process. The change of the flow properties due to the reduced viscosity of the mass is indicated by a decreased extrusion pressure as compared to example 5a.

Example 6

Manufacture of a Dog Bone from a Thermoplastic Composition According to the Invention by Injection Molding Example 6a Manufacture of a Dog Bone by the Extrusion of Thermoplastic Mass and the Direct Transfer of Pellets into the Hopper of an Injection Molding Unit The collagen powder prepared according to example 1 is fed into the hopper of a twin screw extruder (APV twin screw extruder type MP19TC (L/D=40:1)). At adjacent zones along the extruder barrel additionally liquid and solid components can be side fed to the flow of the collagen powder.

The individual components are mixed together by conveying them through mixing zones along the extruder barrel. Mixing elements of the twin screw at the metering zone cause an efficient mixing process. Along the barrel all heating zones are set to 90° C. The rotation speed of the screws is set to 80 rpm.

At a first side feeding zone, a premix of water, colorant "caramel" (10 wt-% based on the water); a flavor "bacon" (10 wt-% on the water) and a scent "smoked" (6 wt-% on the water) is added in a proportion of 15 wt-% (based on the powder) via a gear pump to the flow of the powder. Likewise, at another adjacent side feeding zone 20 wt-% (based on the powder) of glycerin is added to the flow of dry collagen powder. During the process the extrusion pressure is 180 bar. The thermoplastic mass is extruded through a pelletising die into strands with a diameter of about 2 mm. The extruded strands are processed into pellets by a strand pelletiser (Modell Nr. 8 812 01, Brabender Company). The pellets are directly led into the hopper of an injection molding machine (ARBURG Allrounder 221 M 350-55). The temperatures along the barrel and the die temperature are set to 90° C. In the injection molding unit the pellets are transformed into a thermoplastic mass and is injected into a mold to obtain a formed article in the shape of a dog-bone. After the thermoplastic mass has cooled down and solidified, the molding unit is opened and an article having a shape of the mold cavity is obtained.

At start of the injection phase the tool temperature is set to 70° C. The cavity of the mold having a volume of 140 cm$^3$. After the injection phase the tool is cooled down to 30° C., which requires 15 minutes. Once the tool has reached the temperature of 30° C., the molded dog bone is ejected.

Settings of the injection molding unit (ARBURG Allrounder 221 M 350-55):

| | |
|---|---|
| Barrel temperature: | 90° C. |
| Die temperature: | 90° C. |
| Injection volume: | 140 cm$^3$ |
| Pressure: | 800 bar |
| Velocity: | 80 cm$^3$/s |
| Holding up volume: | 3 cm$^3$ |
| Holding up pressure | 150 bar |
| Holding up pressure time | 3 s |
| Total cycle time: | 15 minutes |

Significantly shorter cycle times could be achieved using an intrusion unit instead of a unit for injection molding.

Example 6b

Manufacture of a Dog Bone by Transferring Prepared Pellets into the Hopper of an Injection Molding Unit Pellets prepared according to either of the methods described in examples 3 and 4, but having the composition of example 5b, are transferred into the hopper of an injection molding machine. The temperature along the barrel and the die temperature are set to 90° C. The cavity of the mold has the negative shape of a dog bone with a volume of 140 cm$^3$. At start of the injection phase the tool temperature is set to 70° C. After the injection phase the tool is cooled down to 30° C., which requires 15 minutes. Once the tool has reached the temperature of 30° C., the molded dog bone is ejected.

Settings of the injection molding unit (ARBURG Allrounder 221 M 350-55):

| | |
|---|---|
| Barrel temperature: | 90° C. |
| Die temperature: | 90° C. |
| Injection volume: | 140 cm$^3$ |
| Pressure: | 800 bar |
| Velocity: | 80 cm$^3$/s |
| Holding up volume: | 3 cm$^3$ |
| Holding up pressure | 150 bar |
| Holding up pressure time | 3 s |
| Total cycle time: | 15 minutes |

Significantly shorter cycle times could be achieved using a intrusion unit instead of a unit for injection molding.

Example 7

Formation of a Flat Film from a Thermoplastic Composition According to the Invention by Calendering Pellets prepared according to either of the methods described in examples 3 and 4, but having the composition of example 5b, are fed at a flow-rate of 1 kg/h into the hopper of a twin screw extruder (APV twin screw extruder type MP19TC (L/D=40:1)).

The temperatures along the barrel and the die temperature are set to 90° C. during the extrusion process. The rotation speed of the screws is set to 70 rpm. The thermoplastic mass is extruded into a tape through a flat die (cross section of the die: 70 mm×0.8 mm).

Alternatively, the dry collagen powder manufactured according to example 1 and the citric acid are fed into the hopper at the feed section. Water and glycerol are side fed via gear pumps at adjacent zones so that powder, citric acid, water and glycerol are mixed and transformed into a thermoplastic mass in one continuous process. The temperatures along the barrel and the die temperature are set to 90° C. during the transformation into a thermoplastic mass and extrusion process. The rotation speed of the screws is set to 70 rpm. Again, the composition in form of a mass is extruded into a tape through a flat die (cross section of the die: 70 mm×0.8 mm). During the process the extrusion pressure is 250 bar.

The extruded tape generated according to either of the before-mentioned ways, is then inserted into the nip (0.03 mm) between the heated rolls of a polishing stack (Chill-Roll 136/350 (H), COLLIN Company).

The roll temperatures of the polishing stack, except the chill roll, are set to 60° C. Due to the pressure in the nip the extruded tape is calendered into a flat film with a thickness of less than 100 μm and a width of 150 mm. The calendered film is led over chill rolls and finally reeled in a wind-up unit.

Example 8

Formation of a Tubular Film from a Thermoplastic Composition According to the Invention by Blown Film Extrusion Pellets prepared according to either of the methods described in examples 3 and 4, but having the composition of example 5b, are fed at a flow-rate of 1 kg/h into the hopper of a twin screw extruder (APV twin screw extruder type MP19TC (L/D=40:1)). The temperatures along the barrel and the die temperature are set to 90° C. during the extrusion process. The rotation speed of the screws is set to 70 rpm.

Alternatively, the dry collagen powder manufactured according to example 1 and the citric acid are fed into the hopper at the feed section. Water and glycerol are side fed via gear pumps at adjacent zones so that powder, citric acid, water and glycerol are mixed and transformed into a thermoplastic mass in one continuous process. The temperatures along the barrel and the die temperature are set to 90° C. during the transformation and extrusion process. The rotation speed of the screws is set to 70 rpm.

The thermoplastic mass generated according to either of the before-mentioned methods, is extruded into a tube through a blown film die (nominal diameter: 30 mm, nominal annular gap: 0.8 mm). The inflating air forms the film bubble and subsequently keeps it in shape. During the process the extrusion pressure is 260 bar.

The extruded tubular film is led over pinch rolls to a wind-up unit.

Example 9

Formation of a Foamed Product from a Thermoplastic Composition According to the Invention A thermoplastic composition based on collagen according to the invention is generated in a twin screw extruder (APV twin screw extruder type MP19TC (L/D=40:1)) proceeding as follows:

Dry collagen powder manufactured according to example 1, cochenille powder and citric acid are fed into the first hopper at the feeding section. A plasticizer solution based on water and glycerol is side fed via a gear pump at the adjacent feeding zone, so that the powder and the plasticizer solution are mixed and transformed into a thermoplastic mass in one continuous process. Ethanol is side fed by means of a gear pump at a third feeding zone. The temperatures along the barrel and the die temperature are set to 90° C. during the transformation and extrusion process. The rotation speed of the screws is set to 70 rpm. The total flow-rate of the thermoplastic collagen-based composition is 1 kg/h. The composition of the mass is as follows:

50 wt-% of dry collagen powder manufactured according to example 1
25 wt-% of water
15 wt-% of glycerol
5 wt-% of cochenille powder
5 wt-% of ethanol as the foaming agent In the metering zone a foaming temperature of at least 80° C. has to be reached. The ethanol vapor released is homogenous dispersed by twin screws equipped with kneading discs in the metering zone.

The mass is extruded through a die with a circular cross section having a diameter of 3 mm. During the process the extrusion pressure is 230 bar. The extruded red-colored cylindrical strands are foamed while leaving the die due to the expansion of the gas released. The diameter of the foamed strands is 8 mm.

Example 10

Preparation of a Bottle-Shaped Product from a Thermoplastic Composition According to the Invention by Means of Blow Molding Pellets prepared according to either of the methods described in examples 3 and 4, but having the composition of example 5b, are fed at a flow-rate of 1 kg/h into the hopper of a twin screw extruder (APV twin screw extruder type MP19TC (L/D=40:1)). The temperatures along the barrel and the die temperature during the extrusion process are set to 90° C. The rotation speed of the screws is set to 70 rpm.

The thermoplastic mass conveyed through the extruder is extruded into a tube through a parison die (nominal diameter: 30 mm, nominal annular gap: 1.0 mm). During the process the extrusion pressure is 210 bar.

The extruded tubular parison is seized by the closing blow mold and blown into the shape of a bottle by means of compressed air supplied via a blow mandrel. The height of the blown molded bottle is 150 mm and the diameter is 80 mm. The temperature of the blow mold is set to 20° C. The pressure of the compressed air is 6 bar. After the parison is blown into shape, the blow mould opens and the bottle gets ejected. The wall thickness of the blow molded bottle is 300 μm.

Example 11

Use of Pellets Prepared Analogous to Example 3 (or 3a) in Forming a Foamed Product by Injection Molding Pellets having a certain amount of a physical foaming agent are prepared analogous to example 3 or 3a. (In case the pellets are prepared analogous to examples 3b, 3c or 4, the extrusion temperature must be set below the boiling point of the physical foaming agent).

The composition of the pellets with a physical foaming agent: is as follows:
50 wt-% of dry collagen powder manufactured according to example 1
25 wt-% of water
20 wt-% of glycerol
5 wt-% of ethanol as foaming agent The pellets are transferred into the hopper of an injection molding machine. The temperatures along the barrel and the die temperature are set to 110° C. The tool temperature is set to 20° C. The cavity of the mold has the shape of a plate with the dimensions 180 mm×80 mm×8 mm. A mass volume of 105 cm$^3$ is injected into the mold. The cavity is completely filled up with the mass due to the expansion of the released gas (vapor of ethanol and water). The mass is cooled down due to the contact with the wall of the mold for a period of 120 seconds. After the injection phase the molded foamed plate is ejected.

Settings of the injection molding machine (ARBURG All-rounder 221 M 350-55):

| | |
|---|---|
| Barrel temperature: | 110° C. |
| Die temperature: | 110° C. |
| Tool temperature: | 20° C. |
| Injection volume: | 105 cm$^3$ |
| Injection pressure: | 800 bar |
| Velocity: | 80 cm$^3$/s |
| Cycle time: | 120 s |

It is to be understood that the above described arrangements are simply illustrative of the application of the principles of the invention. Numerous other arrangements may be readily devised by those skilled in the art which will embody the principles of the invention and fall within the spirit and scope thereof.

Comparative Example 12

Compared Contact Welding by the Use of a Welding Press

Pieces of an air dried tubular film with a flat width of 150 mm and a wall thickness of 100 μm conformed from the thermoplastic collagen composition according to example 8, obtained by blown film extrusion is used to prepare bags by heat sealing. Heat sealing is performed on a welding press Type SP3, JOKE-company. The welding press has two sealing bars, the contact area of which is 250 mm×3 mm. The temperature of the upper sealing bar is adjusted to 100° C. The lower polytetrafluoroethylene ("PTFE") covered sealing bar is not heated. One open end of the tubular film is introduced between the gap of the sealing bars. During the welding process the upper heated sealing bar is moved down onto the PTFE coated bar. The welding pressure is adjusted to 300 N, welding time is 2 seconds. Thereafter, the heated bar is released.

The weld strength of the seam reaches more than 100% of the tensile strength of the film material.

The same kind of trial was carried out using a commercially available air dried collagen film ("Coffi", film manufactured by Naturin GmbH & Co. KG, Germany) wherein the collagen component of the film consisted of intact (native, fibrillar) collagen. This film was not weldable.

The invention claimed is:

1. A homogeneous thermoplastic collagen-based composition consisting of: 40 wt % to 65 wt % of non-crosslinked dry collagen powder particles and being based on a fibril forming collagen wherein said collagen has been denatured to a degree of at least 90%, having an average molecular weight of at least 500 kD, a solubility equal to or greater than 25% in water at 60° C. and a particle size in the range of about 30 μm to about 350 μm; 10 wt % to 20 wt % of glycerin; and an additive selected from the group consisting of proteins, biodegradable polymers, blowing agents, modifiers, fillers, lubricants, preservatives, colorants, flowability improvers, flavouring agents and scents, nutritional agents and mixtures thereof; and 20 wt % to 40 wt % of water; wherein said non-crosslinked dry collagen powder and said water from the homogeneous thermoplastic collagen-based composition.

2. The homogeneous thermoplastic collagen-based composition according to claim 1, wherein the non-crosslinked dry collagen powder has an average particle size comprised between 50 μm and 100 μm.

3. The homogeneous thermoplastic collagen-based composition according to claim 1, wherein said protein is selected from the group consisting of an animal derived protein, a plant derived protein, a microbial protein and their mixtures.

4. The homogeneous thermoplastic collagen-based composition according to claim 3, wherein the non-crosslinked dry collagen powder content is about 30 wt % of the total protein content.

5. The homogeneous thermoplastic collagen-based composition according to claim 1, wherein said biodegradable polymer is a natural or synthetic thermoplastic selected from the group consisting of a polyhydroxyalcanoate, a polyalkylenesters, a polylactic acid, a polylactide, a poly-ε-caprolactone, a polyvinyl ester, a polyvinylalcohol and their mixtures.

6. The homogeneous thermoplastic collagen-based composition according to claim 1, consisting of about 56 wt % of the non-crosslinked dry collagen powder; about 24 wt % of water; about 17 wt % of glycerin; and about 2.5 wt % of citric acid.

7. The homogeneous thermoplastic collagen-based composition according to claim 1, consisting of about 50 wt % of the non-crosslinked dry collagen powder; about 25 wt % of water; about 15 wt % of glycerin; about 5 wt % cochenille powder and about 5 wt % of ethanol.

8. The homogeneous thermoplastic collagen-based composition according to claim 1, consisting of about 50 wt % of the non-crosslinked dry collagen powder; about 25 wt % of water; about 15 wt % of glycerin; about 5 wt % of wheat gluten; about 2 wt % of about cochenille powder; about 2 wt % of vanilla flavour; and about 1 wt % of citric acid.

9. The homogeneous thermoplastic collagen-based composition according to claim 1, comprising the non-crosslinked dry collagen powder; about 20 wt % of water comprising about 10 wt % based on water of colorant caramel; about 10 wt % (based on water) of flavour bacon; and about 6 wt % based on water of scent smoked colorant caramel; about 20 wt % of glycerin; and about 2.5 wt % of citric acid.

10. The homogeneous thermoplastic collagen-based composition according to claim 1, consisting of about 50 wt % of the non-crosslinked dry collagen powder; about 25 wt % of water; about 20 wt % of glycerin; and about 5 wt % of ethanol.

11. A process for obtaining the homogeneous thermoplastic collagen-based composition according to claim 1, comprising the following steps:
(i) mixing the non-crosslinked dry collagen powder and the water;
(ii) subjecting the mixture of the non-crosslinked dry collagen powder and the water obtained in step (i) at shearing forces, to a temperature comprised between 30 and 160°-C. and to a pressure comprised between 20 and 350 bar until the components are transformed into the homogeneous thermoplastic collagen-based composition in form of a mass; and optionally
(iii) transforming said homogeneous thermoplastic collagen-based composition in form of a mass, into pellets.

12. The process according to claim 11, further comprising the addition of one or more additives to the non-crosslinked dry collagen powder, to the water, to step (i), or to step (ii) and wherein said additive is homogeneously integrated into the homogeneous thermoplastic collagen-based composition obtained in form of a mass, or pellets process according to claim 11, further comprising the addition of one or more additives, simultaneously or separately, to the non-crosslinked dry collagen powder, to the water, to step (i), or to step (ii) and wherein said additive is homogeneously integrated into the homogeneous thermoplastic collagen-based composition obtained in form of a mass, or pellets process according to claim 11, further comprising the addition of one or more additives, simultaneously or separately, to the non-crosslinked dry collagen powder, to the water, to step (i), or to step (ii) and wherein said additive is homogeneously integrated into the homogeneous thermoplastic collagen-based composition obtained in form of a mass, or pellets.

13. The process according to claim 11, wherein the process is carried out in a continuous mixing system.

14. The process for manufacturing a shaped solid article according to claim 11, comprising subsequently conforming the homogeneous thermoplastic collagen-based composition in form of a mass obtained in step (ii) or conforming the pellets as obtained in step (iii).

15. The process for manufacturing a shaped solid article according to claim 14, wherein the conforming method is injection molding through a slotted die, (ii) obtaining a primary film; and (iii) rolling it out in a system of heated calendars until the desired wall thickness and the film width are achieved.

16. The process according to claim 14, further comprising (i) pressing out the homogeneous thermoplastic collagen-based composition through an annular die; and (ii) forming a tubular film by means of blown film extrusion.

17. The process according to claim 14, comprising (i) pressing out the homogeneous thermoplastic collagen-based composition through a flat die and forming a tape.

18. The process according to claim 14, further comprising (i) pressing out the homogeneous thermoplastic collagen-based composition through a parison die; and (ii) blowing it into a shape of a hollow body.

19. A method of using the homogeneous thermoplastic collagen-based composition according to claim 1 to manufacture a shaped solid article comprising subjecting said collagen-based composition to a conforming method selecting from the group consisting of compression molding, blown film extrusion, blown film co-extrusion, blow molding, rotation molding, transfer molding, extrusion molding, co-extrusion molding, vacuum forming, pressure forming, inflation molding and injection molding.

20. A shaped solid article conformed from the homogeneous thermoplastic collagen-based composition according to claim 1.

21. The shaped solid article according to claim 20, selected from the group consisting of an outdoor sport article; a sheet; a bag; a tray; a bottle; a tubing; dishware, comprising a cup, a plate, a dish; a flatware comprising a knife, a fork, a spoon, or another eating utensil; a pet-toy; a pet-chew; a food article comprising a candy, a sweet, a snack food; animal food; a flat film; a tubular film; a fishing bait, a fishing lure; a wine gum type product; a foamed article; a packaging material for other articles; a lose fill packing pellet; a food packaging material and a container.

22. The shaped solid article according to claim 21, wherein the pet-chew is a dog-chew.

23. The process for manufacturing the shaped solid article according to claim 20, which comprises a method of conforming the homogeneous thermoplastic collagen-based composition.

24. The process for manufacturing the shaped solid article according to claim 23, wherein said conforming method is selected from the group consisting of compression molding, blown film extrusion, blown film co-extrusion, blow molding, rotation molding, transfer molding, extrusion molding, co-extrusion molding, vacuum forming, pressure forming, inflation molding and injection molding.

25. The process for manufacturing a shaped solid article according to claim 24, wherein the conforming method is injection molding.

26. The shaped solid article obtained by the process according to claim 23 which is further submitted to a curing bath or a curing atmosphere.

27. A homogeneous thermoplastic collagen-based composition consisting of: about 20 wt % to 95 wt % of a non-crosslinked dry collagen powder comprising particles and being based on a fibril forming collagen wherein said collagen has been denatured to a degree of at least 90% and has an average molecular weight of at least 500 kD, a solubility equal to or greater than 25% in water at 60° C. and a particle size in the range of about 30 pm to about 350 m; about 5 wt % to 80 wt % of water; an additive selected from the group consisting of proteins, biodegradable polymers, blowing agents, modifiers, fillers, lubricants, preservatives, colorants, flowability improvers, flavouring agents and scents, nutritional agents and their mixtures; an about 10 wt % to 20 wt % of glycerin; wherein said non-crosslinked dry collagen powder with said water, additive and plasticizer form a homogeneous thermoplastic collagen-based composition.

* * * * *